W. A. Sweet,
Harvester Cutter.
No. 40,884.  Patented Dec. 8, 1863.
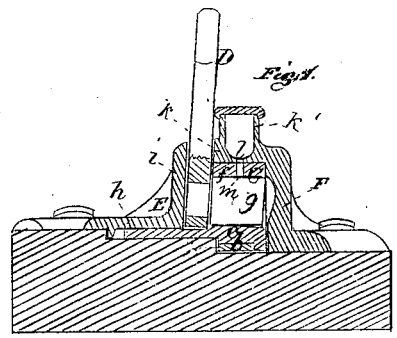
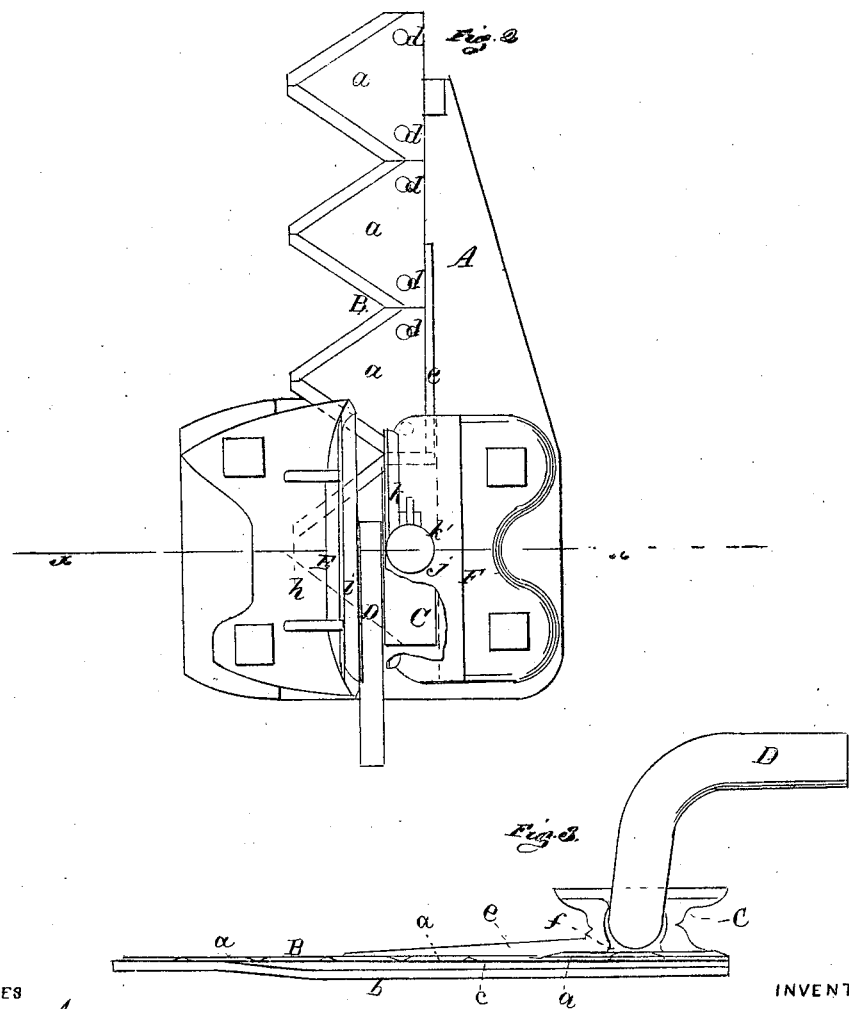
WITNESSES
J. W. Coombs
Geo. W. Reed
INVENTOR
William A. Sweet
per Munn & Co
attorneys

UNITED STATES PATENT OFFICE.

WILLIAM A. SWEET, OF SYRACUSE, NEW YORK.

IMPROVEMENT IN HARVESTERS.

Specification forming part of Letters Patent No. 40,864, dated December 8, 1863.

*To all whom it may concern:*

Be it known that I, WILLIAM A. SWEET, of Syracuse, in the county of Onondaga and State of New York, have invented certain new and useful Improvements pertaining to the Cutters of Grain and Grass Harvesters; and I do hereby declare that the following is a full, clear, and exact description of the same, reference being had to the accompanying drawings, making a part of this specification, in which—

Figure 1 is a transverse vertical section of my invention, taken in the line $x\ x$, Fig. 2; Fig. 2, a plan or top view of the same, partly in section; Fig. 3, a detached view of the sickle with cutter-head and pitman attached.

Similar letters of reference indicate corresponding parts in the several figures.

This invention relates, first, to an improved manner of attaching the cutter-bar head to the cutter, whereby the upper surface of the cutter is left perfectly free from all obstructions, a plain, smooth surface being retained, so that the cut grass or grain may pass freely over it. This result is attained by having the shank of the cutter-bar head made in taper form and interposed between the sickle and the cutter-bar, as hereinafter fully set forth.

The invention relates, second, to an improved arrangement of the slot-cap and guideway, whereby the pitman is provided with a suitable guide to prevent lateral working, as hereinafter described.

To enable those skilled in the art to fully understand and construct my invention, I will proceed to describe it.

A represents a portion of the finger-bar of a grain or grass harvester, and B the sickle, $a$ being the teeth and $b$ the bar to which the teeth are attached. The teeth $a$ may be of the usual form.

C represents the cutter-bar head, which is formed with a shank, $c$, of taper form longitudinally, and of such dimensions that it may be fitted or interposed between the cutter-bar $b$ and teeth $a$ at one end of the sickle, the teeth $a$ over the shank $c$ being secured by rivets $d$, which pass through the shank and cutter-bar. The cutter-bar $b$ is bent downward a trifle below the shank $c$, so as to admit of the upper surface of the shank and the bar $b$ beyond the shank being in or about in the same plane, as will be seen by referring to Fig. 3. The shank $c$ has an upright ledge or flange, $e$, at its back edge, said ledge or flange extending up above the teeth $a$, (see Fig. 3,) while its lower edge extends down flush with the bottom of the cutter-bar $b$, as shown in Fig. 1. The cutter-bar head C has a flat or plane upper surface, and an eye or hole, $f$, is made horizontally through it to receive the journal $g$ of the pitman D, as shown more particularly in Fig 1.

E represents the slot-cap, which is bolted to the frame of the machine and projects over the teeth $a$ of the sickle near the cutter-bar head C. (See Fig. 1.) This slot-cap is of angle form, the lower part, $h$, projecting over the teeth $a$, and the other part, $i$, being vertical and extending upward a short distance above the top of the cutter-bar head C.

F represents the way-guide, which is bolted to the frame of the machine just behind the slot-cap E. The upper part, $j$, of this way-guide projects over horizontally toward the upper end of the slot-cap E, a sufficient space being allowed between the two to admit of the pitman D working therein. The upper part, $j$, of the way-guide has a vertical flange, $k$, which is parallel with the vertical part $i$ of the slot-cap, and forms a bearing-surface for the pitman at one side, as shown in Fig. 1.

The slot-cap and way-guide, in consequence of being arranged as shown, form a perfect guide for the pitman D, preventing all lateral motion of the same, and dispensing with the use of a pin to keep the journal $g$ within the eye or hole $f$ of the cutter-bar head, the pitman in its operation not extending beyond the ends of the slot-cap and way-guide.

I do not claim broadly a slot-cap and way-guide irrespective of the construction and operation herein shown and described; but I do claim as new and desire to secure by Letters Patent—

1. The attaching or securing of the cutter-bar head C to the sickle B by providing said head C with a shank, $c$, of taper form interposed between the cutter-bar $b$ and the teeth $a$ of the sickle, substantially in the manner as and for the purpose herein set forth.

2. The peculiar construction and arrangement of the slot-cap E and way-guide F, substantially as shown, for the purpose of forming a guide for the pitman D, and for the retaining of the journal $g$ within the cutter-bar head C, as set forth.

WM. A. SWEET.

Witnesses:
CHARLES C. BATES,
GEO. W. GRAY.